United States Patent [19]

Houlihan

[11] 3,715,366
[45] Feb. 6, 1973

[54] DIARYLIMIDAZO [2,1-A]ISOINDOLES

[75] Inventor: William J. Houlihan, Mountain Lakes, N.J.

[73] Assignee: Sander-Wander, Inc., Hanover, N.J.

[22] Filed: March 17, 1971

[21] Appl. No.: 125,336

[52] U.S. Cl............260/309, 260/296 T, 260/309.6, 424/263, 424/273
[51] Int. Cl...........................................C07d 49/36
[58] Field of Search..........................260/309, 296 T

[56] References Cited

UNITED STATES PATENTS

| | | | |
|---|---|---|---|
| 2,989,537 | 6/1961 | Druey et al. | 260/309.7 |
| 3,334,113 | 8/1967 | Houlihan | 260/309.7 |

OTHER PUBLICATIONS

Hollins, The Synethesis of Nitrogen Ring Compounds, pages 28 and 91, N.Y., Van Nostrand, 1924, QD401.H7.
Houlihan II Chem. Abst. Vol. 71, No. 112, 934e (1969). QD1.A51.

*Primary Examiner*—Natalie Trousof
*Attorney*—Gerald D. Sharkin, Thomas C. Doyle, Robert S. Honor, Walter F. Jewell, Thomas O. McGovern, Richard E. Vila and Frederick H. Weinfeldt

[57] ABSTRACT

Diarylimidazo {2,1-a} isoindoles, e.g., 5-(p-chlorophenyl)-5-phenyl-5H-imidazo {2,1-a} isoindoles, are prepared by acid rearrangement of 2-(2'-imidazolyl)-$\alpha,\alpha$-diaryl substituted benzyl alcohols and are useful as anti-microbials.

2 Claims, No Drawings

DIARYLIMIDAZO [2,1-A]ISOINDOLES

This invention relates to imidazo {2,1-a} isoindole derivatives which exhibit antimycotic activity. In particular, it relates to diaryl substituted imidazo {2,1-a} isoindoles, their preparation and intermediates used in their preparation.

The compounds of this invention may be represented by the formula

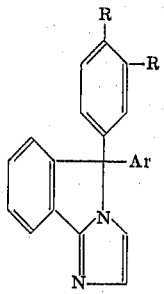

where each

R independently represents hydrogen, halo having an atomic weight of about 19 to 36, lower alkyl, i.e., alkyl having one to four carbon atoms, e.g., methyl, ethyl, isopropyl and the like, lower alkoxy, i.e., alkoxy having one to four carbon atoms, e.g., methoxy, ethoxy, isopropoxy and the like or trifluoromethyl and Ar represents

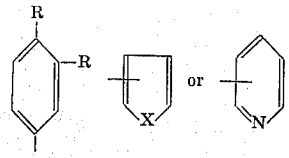

where

X is —O— or —S— and R is as defined above provided trifluoromethyl groups are not bonded to adjacent carbon atoms and pharmaceutically acceptable acid addition salts thereof.

The compounds of formula (I) are prepared in accordance with the following reaction scheme:

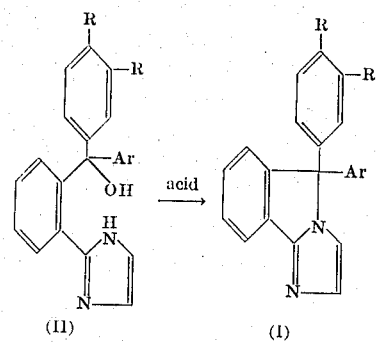

where

R, Ar and the proviso are as set out above.

The compounds of formula (I) are prepared by treating compounds of formula (II) with an organic acid. The particular organic acid used is not critical but acetic acid, trifluoroacetic acid, trichloroacetic acid, alkylsulfonic acids, such as methanesulfonic acid, ethanesulfonic acid and the like, and arylsulfonic acids, such as benzenesulfonic acid, p-totuenesulfonic acid and the like, are preferred. Although a solvent is not necessary, it is preferred that the reaction be carried out in excess organic acid or in an inert solvent, e.g., hydrocarbons and chlorinated hydrocarbons, such as pentane, hexane, benzene, toluene, methylene dichloride, chlorobenzene and the like and ethers such as diethyl ether or tetrahydrofuran. The process is preferably carried out at temperatures between about 50° to 200° C., especially at the reflux temperature of the system. For optimum results, the reaction is run for about 6 to 72 hrs. The particular solvent used, the reaction temperature and the reaction time are not critical. The product is recovered by conventional techniques e.g., evaporation or recrystallization.

The compounds of formula (II) are novel and are prepared in accordance with the following reaction scheme:

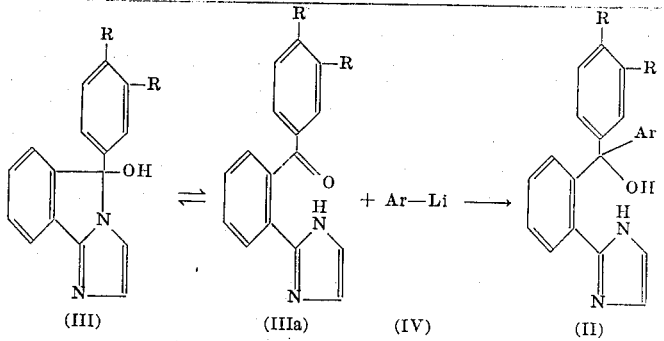

where

R, Ar and the proviso are as set out above.

The compounds of formula (II) are prepared by treating compounds of formula (III) with an aryl lithium compound (IV) in an inert atmosphere. The inert atmosphere is preferably nitrogen, argon or helium. Although a solvent is not necessary, it is preferred that the reaction be carried out in an inert solvent, e.g., hydrocarbons, such as pentane, hexane, benzene, toluene, and the like and especially ethers such as diethyl ether or tetrahydrofuran. The temperature of the reaction is not critical but it is preferred that the process be carried out at temperatures between about −10° to 35° C, especially 0° to 20° C. For optimum results the reaction is run for about 2 to 48 hrs; preferably 8 to 24 hrs. The particular solvent used in the preparation and the reaction time are not critical. The product is recovered by conventional techniques e.g., chromatography.

The compounds of formula II may be represented by their tautomeric equivalents formulas

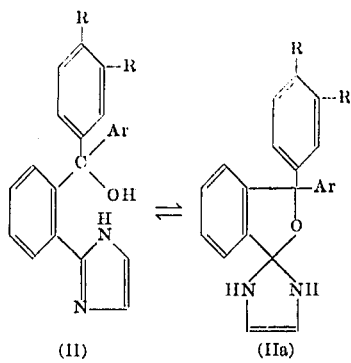

(II)   (IIa)

where R, Ar and the proviso are set out above.

It will be appreciated that these tautomers can exist in equilibrium. Which tautomer predominates will depend on such factors as whether the compound is a solid or in solution, the pH and the polarity of the environment. In order to simplify the present description, however, formula (II) only will be used, although both tautomeric forms are considered to be within the concept of the instant invention.

Many of the compounds of formula (III) and its tautomer (IIIa) and the compounds of formula (IV) are known and can be prepared by methods described in the literature. The compounds of formula (III), (IIIa) and (IV) which are not specifically disclosed in the literature can be prepared by analogous methods using known starting materials.

The compounds represented by formula (I) above are useful as anti-mycotic agents as indicated by their activity at concentrations of 4 to 100 micrograms/ml in vitro against organisms such as trichophyton mentagrophytes, candida albicans, penicillum comune, aspergillus niger, microsporium felineum, and the like. This is indicated by their activity when tested using a conventional serial dilution test.

For such usages, compounds (I) may be administered orally, parenterally or topically as such or admixed with conventional pharmaceutical carriers. They cay be administered orally in such forms as tablets, dispersible powders, granules, capsules, syrups, and elixirs; parenterally as solutions, suspensions, dispersions, emulsions, and the like, e.g., a sterile injectable aqueous suspension and topically as solutions, salves and the like. These pharmaceutical preparations may contain up to about 90 percent of the active ingredient in combination with the carrier or adjuvant.

Furthermore, these compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate, maleate, malate, tartrate, methanesulfonate, cyclohexylsulfamate and the like.

Although the anti-mycotic effective dosage utilized in the treatment of mycosis will vary depending upon the compound employed and the mode of administration, in general, satisfactory results are obtained when these compounds are orally administered for systemic use at a daily dosage of about 20 mg. to about 100 mg. per kilogram of animal body weight. This daily dosage is preferably administered two to four times a day, or in sustained release form. For most large mammals in need of said treatment the total daily dosage is from about 1 gm. to about 7 gm. Dosage forms suitable for internal use comprise about 250 mg. to about 3.5 g. of active compound in intimate admixture with a solid or liquid pharmaceutically acceptable carrier or diluent.

The preferred pharmaceutical compositions form the standpoint of preparation and ease of administration are solid compositions, particularly hard-filled capsules and tablets containing about 50 to 100 milligrams of active ingredient.

Tablets and capsules containing the ingredients indicated below may be prepared by conventional techniques and are useful in treating mycosis at a dose of one tablet or capsule two to four times a day.

| Ingredients | Weight (mg.) tablet | capsule |
| --- | --- | --- |
| 5-(p-chlorophenyl)-5-phenyl-5H-imidazo {2-1-a}-isoindole hydrochloride | 250 | 250 |
| Tragacanth | 10 | — |
| Lactose | 197.5 | 250 |
| Corn starch | 25 | |
| Talcum | 15 | |
| Magnesium stearate | 2.5 | |

The following pharmaceutical compositions are formulated with the indicated amount of active agent using conventional techniques. The injectable solution and the oral liquid solution represent formulations useful in the treatment of mycosis.

| | Injectable (Weight %) | Liquid (Weight %) |
| --- | --- | --- |
| 5-(p-chlorophenyl)-5-phenyl-5H-imidazo {2,1-a} isoindole hydrochloride | 10 | 0.5 to 3.5 |
| Sodium alginate | 0.5 | — |
| Sodium benzoate | — | 0.1 to 0.5 |
| Simple syrup | — | 30 to 70 |
| Lecithin | 0.5 | — |
| Sodium chloride | as desired | |
| Flavor | — | as desired |
| Color | — | as desired |
| Sorbitol solution 70% U.S.P. | — | 10 to 30 |
| Buffer agent to adjust pH for desired stability | as desired | as desired |
| Water | To desired volume | To desired volume |

EXAMPLE 1

5-(p-chlorophenyl)-5-phenyl-5H-imidazo {2,1'a} isoindole hydrochloride

Step A: 2-(2'imidazolyl)-α-phenylbenzyl alcohol

Into a flask equipped with a stirrer, condenser, dropping funnel and maintained under a nitrogen blanket is changed 100ml anhydrous tetrahydrofuran and 5.6g (0.02 mole) of 5-(4-chlorophenyl)-5-hydroxy-5H-imidazo {2,1-a} isoindole. The mixture is cooled to about 0° C, and over a period of about 20 minutes, 21 ml. (0.05 mole) of 2.39 molar phenyllithium in benzene is added while maintaining the temperature at 0° to 5° C. The mixture is allowed to stir overnight at room temperature after which 25 ml. of saturated amonnium chloride solution is added dropwise followed by about 25 g. of anhydrous sodium sulfate. The salts are filtered off and the filtrate is concentrated in vacuo. The residue is dissolved in chloroform and chromatographed on a silica gel column using chloroform as the eluant to give 2-(2'-imidazolyl)-α-(p-chlorophenyl)-α-phenylbenzyl alcohol (m.p. 194°–197°).

When an equivalent amount of 5-phenyl-5-hydroxy-5H-imidazo {2,1'-a} isoindole 5-(3,4-dichlorophenyl)-5-hydroxy-5H-imidazo {2,1-a} isoindole, 5-(4-tolyl)-5-hydroxy-5H-imidazo {2,1-a} isoindole, 5-(4-methoxyphenyl)-5-hydroxy-5H-imidazo {2,1-a} isoindole or 5-(4-trifluoromethylphenyl)15-hydroxy-5H-imidazo {2,1-a} isoindole is used in place of the 5-(4-chlorophenyl)-5-hydroxy-5H-imidazo {2,1-a} isoindole above there is obtained 2-(2'-imidazolyl)-α,α-diphenylbenzyl alcohol,2-(2'-imidazolyl)-α-(3,4-dichlorophenyl)-α-phenylbenzyl alcohol, 2-(2'-imidazolyl)-α-(4-tolyl)-α-phenylbenzyl alcohol, 2-(2'-imidazolyl)-α-(4-methoxyphenyl)-α-phenylbenzyl alcohol or 2-(2'-imidazolyl)-α-(4-trifluoromethylphenyl)-α-phenylbenzyl alcohol respectively.

Step B: 5-(p-chlorophenyl)-5-phenyl-5H-imidazo {2,1-a} isoindole hydrochloride

Into a flask equipped with a stirrer and reflux condenser is charged 1.3 g of 2-(2'-imidazolyl)-α-(p-chlorophenyl)-α-phenylbenzyl alcohol and 15 ml. of acetic acid. The solvent is stirred and refluxed for 48 hours after which the solvent is removed in vacuo. The residue is treated with 5 ml. saturated sodium bicarbonate then dissolved in toluene. The toluene layer is separated, dried with anhydrous magnesium sulfate and filtered. The filtrate is then treated with a stream of anhydrous hydrogen chloride gas to yield 5-(p-chlorophenyl)-5-phenyl-5H-imidazo {2,1-a} isoindole (m.p. 254°–257° C) hydrochloride.

Following the above procedure, but using an equivalent amount of 2-(2'-imidazolyl)-α,α-diphenylbenzyl alcohol, 2-(2'imidazolyl)-α-(3,4-dichlorophenyl)-α-phenylbenzyl alcohol, 2-(2'-imidazolyl)-α-(4-totyl)-α-phenylbenzyl alcohol, 2-(2'-imidazolyl)-α-(4-methoxyphenyl)-α-phenylbenzyl alcohol or 2-(2'-imidazolyl)-α-(4-trifluoromethylphenyl)-α-phenylbenzyl alcohol in place of the 2-(2'-imidazolyl)-α-(p-chlorophenyl)-α-phenylbenzyl alcohol used therein, there is obtained the hydrochloride salt of 5,5-diphenyl-5H-imidazo {2,1-a} isoindole, 5-(3,4-dichlorophenyl)-5-phenyl-5H-imidazo {2,1-a} isoindole, 5-(4-tolyl)-5-phenyl-5H-imidazo {2,1-a} isoindole, 5-(4-methoxyphenyl)-5-phenyl-5H-imidazo {2,1-a} isoindole or 5-(4-trifluoromethylphenyl)-5-phenyl-5H-imidazo {2,1-a} isoindole respectively.

EXAMPLE 2

5,5-di-(p-chlorophenyl)-5H-imidazo {2,1-a} isoindole

When the process of step A of example 1 is carried out using an equivalent amount of p-chlorophenyllithium, p-tolyllithium, p-methoxyphenyllithium, p-trifluoromethylphenyllithium, 2-thienyllithium, 2-pyridyllithium or 2-furyllithium in place of the phenyllithium used therein there is obtained 2-(2'-imidazolyl)-α,α-di-(p-chlorophenyl)-benzyl alcohol, 2-(2'-imidazolyl)-α-(p-chlorophenyl)-α-(p-tolyl)-benzyl alcohol, 2-(2'-imidazolyl)-α-(p-chlorophenyl)-α-(p-methoxyphenyl)-benzyl alcohol, 2-(2'-imidazolyl)-α-(p-chlorophenyl)-α-(p-trifluoromethylphenyl)-benzyl alcohol, 2-(2'-imidazolyl)-α-(p-chlorophenyl)-α-(2-thienyl)-benzyl alcohol, 2-(2'-imidazolyl)-α-(p-chlorophenyl)-α-(2-pyridyl)-benzyl alcohol or 2-(2'imidazolyl)-α-(p-chlorophenyl)-α-(2-furyl)-benzyl alcohol, respectively.

Following the procedure of step B of example 1 but using an equivalent amount of 2-(2'-imidazolyl)-α,α-di-(p-chlorophenyl)-benzyl alcohol, 2-(2'-imidazolyl)-α-(p-chlorophenyl)-α-(p-tolyl)-benzyl alcohol, 2-(2'-imidazolyl)-α-(p-chlorophenyl)-α-(p-methoxyphenyl)-benzyl alcohol, 2-(2'-imidazolyl)-α-(p-chlorophenyl)-α-(p-trifluoromethylphenyl)-benzyl alcohol, 2-(2'-imidazolyl)-α-(p-chlorophenyl)-α-(2-thienyl)-benzyl alcohol, 2-(2'-imidazolyl)-α-(p-chlorophenyl)-α-(2-pyridyl)-benzyl alcohol or 2-(2'-imidazolyl)-α-(p-chlorophenyl)-α-(2-pyridyl)benzyl alcohol in place of the 2-(2'-imidazolyl)-α-(p-chlorophenyl)-α-phenylbenzyl alcohol used therein, there is obtained the hydrochloride salt of 5,5-di-(p-chlorophenyl)-5H-imidazo {2,1-a} isoindole, 5-(p-chlorophenyl)-5-(p-tolyl)-5H-imidazo {2,1-}isoindole, 5-(p-chlorophenyl)-5-(p-methoxyphenyl)-5H-imidazo {2,1-a} isoindole, 5-(p-chlorophenyl)-5-(p-trifluoromethylphenyl)-5H-imidazo {2,1-a} isoindole, 5-(p-chlorophenyl)-5-(α-thienyl)-5H-imidazo {2,1-a} isoindole, 5-(p-chlorophenyl)-5-(α-pyridyl)-5H-imidazo {2,1-a} isoindole, or 5-(p-chlorophenyl)-5-(α-furyl)-5H-imidazo {2,1-a} isoindole, respectively.

What is claimed is:

1. A compound of the formula

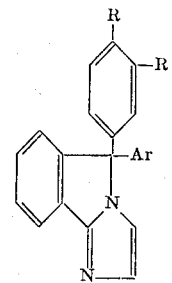

where
Ar represents

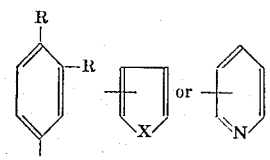

X is —O— or —S—; and
each
R independently represents hydrogen, halo having an atomic weight of about 19 to 36, lower alkyl, lower alkoxy or trifluoromethyl or a pharmaceutically acceptable acid addition salt thereof provided trifluoromethyl groups are not bonded to adjacent carbon atoms.

2. The compound of claim 1 which is 5-(p-chlorophenyl)-5-phenyl-5H-imidazo[2,1-a]isoindole.

* * * * *